United States Patent
Skjermo et al.

(10) Patent No.: US 11,097,577 B2
(45) Date of Patent: Aug. 24, 2021

(54) TIRE HEALTH SENSOR ASSEMBLY

(71) Applicant: EL-WATCH AS, Rindal (NO)

(72) Inventors: Tor Öistein Skjermo, Rindal (NO); Häkon Bolme, Rindal (NO)

(73) Assignee: EL-WATCH AS, Rindal (NO)

( * ) Notice: Subject to any disclaimer, the term of this patent is extended or adjusted under 35 U.S.C. 154(b) by 88 days.

(21) Appl. No.: 16/624,396

(22) PCT Filed: Jun. 21, 2018

(86) PCT No.: PCT/NO2018/050167
§ 371 (c)(1),
(2) Date: Dec. 19, 2019

(87) PCT Pub. No.: WO2018/236224
PCT Pub. Date: Dec. 27, 2018

(65) Prior Publication Data
US 2020/0122529 A1  Apr. 23, 2020

(30) Foreign Application Priority Data

Jun. 22, 2017 (NO) .................................... 20171020

(51) Int. Cl.
*B60C 23/04* (2006.01)

(52) U.S. Cl.
CPC ...... *B60C 23/0493* (2013.01); *B60C 23/0411* (2013.01); *B60C 23/0442* (2013.01); *B60C 23/0479* (2013.01); *B60C 23/0498* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| 5,708,411 A | 1/1998 | Hill |
| 6,462,650 B1 | 10/2002 | Balzer et al. |

(Continued)

FOREIGN PATENT DOCUMENTS

| CA | 2852483 A1 * | 11/2015 | ......... B60C 23/0498 |
| DE | 102007053153 A1 | 5/2009 | |
| WO | WO-2010061845 A1 * | 6/2010 | .......... G01M 17/021 |

OTHER PUBLICATIONS

International Search Report and Written Opinion dated Oct. 1, 2018 (PCT/NO2018/050167).

(Continued)

*Primary Examiner* — Andre J Allen
(74) *Attorney, Agent, or Firm* — Alix, Yale & Ristas, LLP

(57) ABSTRACT

Tire health sensor assembly for arrangement in a vehicle tire formed by a housing arranged for accommodating a magnet assembly formed by at least one magnet, a sensor module including at least one tire pressure sensor, power means in the form of at least one battery or capacitor and/or energy harvester, and a communication module wherein the magnet assembly and sensor module are arranged at lower part of the housing providing the housing, and accordingly the tire health sensor assembly, with a centre of gravity at lower part of the housing which together with magnetic force of the magnet assembly are arranged to self-align/correct the tire health sensor assembly in relation to an inner circumferential surface of the tire, and attachment to a metal cord of the tire or metal wheel of the tire.

20 Claims, 2 Drawing Sheets

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 8,723,661 | B2 | 5/2014 | Sham et al. |
| 8,742,912 | B2 | 6/2014 | Blanchard |
| 8,939,020 | B2 | 1/2015 | Townsend et al. |
| 2011/0315292 | A1 | 12/2011 | Gougnaud |
| 2012/0085160 | A1 | 4/2012 | Dussinger et al. |
| 2014/0007666 | A1 | 1/2014 | Kutzscher et al. |
| 2015/0336435 | A1 | 11/2015 | Laird et al. |
| 2021/0046788 | A1* | 2/2021 | Motamed ................ B60C 99/00 |

OTHER PUBLICATIONS

International Preliminary Report on Patentability dated Jun. 11, 2019 (PCT/NO2018/050167).

* cited by examiner

TIRE HEALTH SENSOR ASSEMBLY

BACKGROUND

The disclosed embodiments relate to a tire health sensor assembly, and more particularly to a wireless free-standing tire health sensor assembly which can be arranged in a tire of a vehicle for at least measuring tire pressure.

Tire pressure for a vehicle is a critical factor. Wrong tire pressure will to a large extent affect the safety of the vehicle, as well as affecting economy and environmental emission negatively.

The tire pressure is rarely checked, often only 1-2 times per year. It is thus a possibility that one drives with too low or high pressure over long periods in time.

The advantages of driving with a correct tire pressure are increased lifetime of the tire, lower fuel consumption, environmental benefits, driving characteristics and safety.

There exist several different methods for continuous measurement of the tire pressure of a vehicle, where the most of these methods are based on arrangement of a wireless pressure sensor in the valve of the tire, or as a fixed device on the wheel rim.

From US2015336435 A1 (Rimex Supply Ltd) it is known a magnetic mount for magnetically mounting a tire pressure sensor inside a vehicle tire. The solution is based on a flexible frame provided with neodymium magnets which engage the wheel rim. The frame is provided with a pressure sensor and arranged to the wheel rim by means of assembly tools.

US2014007666 A1 (Ontario INC) discloses a similar monitoring system which contains at least one magnet which can be arranged to a tire rim. The magnet is fixed to a monitor which monitors the conditions in a cavity between tire and wheel rim. The monitor can be provided with a wireless transmitter for signal transfer.

Other solutions which exist are solutions where free/unmounted pressure meters are arranged inside the tire where they can move freely, as e.g. disclosed in U.S. Pat. No. 8,939,020 B2 (Caterpillar Inc.), U.S. Pat. No. 8,723,661 B2 (Shan Mang Lung et. al.) and U.S. Pat. No. 8,742,912 B2 (STMICROELECTRONICS, INC.).

U.S. Pat. No. 8,723,661 is only suitable for use in slow-moving vehicles with sand-filled tires as the solution is based on a rolling ball which will disintegrate under the velocities a vehicle, truck or trailer operates. The sensor will further not be positioned close to the tire thread and will thus not be able to provide reliable information of state/instantaneous status of the tire (e.g. temperature).

U.S. Pat. No. 8,742,912 requires a receiver for each wheel/wheel well which increases the installation costs and complexity. The solution is further not arranged for providing information about tire pressure when the wheel is standing still, something which would be essential for trucks and trailers.

Both US2015336435 A1 and US2014007666 A1 are related to magnetic fastening of monitors/sensors in the wheel well of a wheel rim, which requires manual/accurate assembly.

Further, by that the sensor means in prior art are arranged to the metal wheel rim, this will result in that when measuring temperature this will be affected by the temperature of the metal wheel rim.

Another disadvantage with prior art solutions is that they are only capable of being attached to the metal wheel, and if they for some reason is knocked out of position or out of engagement with the metal wheel they will not re-attached and will be bouncing around in the tire and be damaged.

It is accordingly a need for a tire health sensor assembly which does not require accurate assembly in the tire.

It is further a need for a tire health sensor assembly which will automatically be restored/re-attached if knocked out of position.

It is further a need for a tire health sensor assembly capable of measuring temperature in the tire itself, and not the temperature of the air in the tire, which possibly is affected by the temperature of the metal wheel rim. Being able to discover high temperature in the tire as early as possible will be favorable to avoid damage to the tire and a dangerous situation.

It is further a need for a tire health sensor assembly which can be arranged close to the tire thread to enable possibility to gain state information/instantaneous status, such as temperature, vibrations, tire thread depth, etc.

There is also a need for a tire health sensor assembly which does not need mounting tools for arrangement in a wheel/tire.

There is also a need for a tire health sensor assembly arranged for duplex communication.

SUMMARY

Provided herein is a tire health sensor assembly that partly or entirely solves the drawbacks/lacks of prior art.

Also provided is a tire health sensor assembly which does not require accurate or advanced assembly in a tire of a vehicle.

Also provided is a tire health sensor assembly arranged to be self-aligning/correcting in relation to a circumferential surface of the tire containing metal.

Also provided is a tire health sensor assembly arranged to be automatically re-attached if knocked out of position/engagement with the tire.

Also provided is a tire health sensor assembly arranged to withstand impact if bouncing around in the tire.

Also provided is a tire health sensor assembly arranged for wireless duplex communication, short range and/or long range.

It Also provided is a tire health sensor assembly which in addition to measuring tire pressure can be provided with various sensors for measuring one or more of: temperature, vibrations, motion, sound, speed, direction, orientation, moisture, gas, tire pattern depth, etc.

Also provided is a tire health sensor assembly which can form a sensor platform where also sensor data from other sensors associated with a vehicle, truck or trailer can be collected and used.

Also provided is a tire health sensor assembly being self-supplied of power.

A tire health sensor assembly is based on a housing for accommodating a magnet assembly including at least one magnet, a sensor module and a duplex communication module. The sensor module will typically comprise a control unit with internal or external memory and at least one pressure sensor for measuring tire pressure. The tire health sensor assembly can be arranged for measuring current tire pressure and/or for measuring tire pressure variations.

The sensor module can further be provided with sensors for measuring one or more of the following: temperature, vibrations, motion, sound, speed, direction, orientation, moisture, gas, tire pattern depth, etc.

The housing will further be arranged for accommodating power means in the form of at least one battery or capacitor and/or energy harvester. The power means can further include at least one energy harvester capable of providing at least a part of the energy required to operate the tire health sensor assembly. The energy harvester can e.g. be a resonant mechanical device in a material capable of generating electric power when subjected to mechanical influence (e.g. acceleration, rotation, bending, etc.), for example a piezoelectric device or be a device capable of transforming mechanical energy or kinetic energy, for example from mechanical vibration, into electric energy. In one embodiment, the energy harvester is coupled to the battery, such as a Lithium battery, or capacitor.

The sensor(s) of the tire health sensor assembly is preferably sensor(s) consuming low energy such that the tire health sensor assembly will have a lifetime over several years. With an energy harvester in addition to a battery or capacitor the lifetime of such a tire health sensor assembly will be almost unlimited.

The magnet assembly of the tire health sensor assembly will be arranged at lower part of the housing and is arranged for self-aligning/correcting the tire health sensor assembly against a circumferential interior surface of the tire, preferably a surface adjacent the metal cord in the tire and attach the tire health sensor assembly/housing to the inside of the tire regardless of velocity. Accordingly, no glue or special fixing device is required as the magnet will attach to the metal cord of the tire which contains a lot of metal.

Accordingly, the tire health sensor assembly disclosed herein will provide a plain installation in a tire, as one only will have to place the tire health sensor assembly between tire and rim/metal wheel and the tire health sensor assembly will self-align/correct and attach to the metal cord of the tire.

According to a first embodiment, the magnet assembly is arranged at lower part of the housing and the sensor module is arranged next to the magnet assembly. In a further embodiment there is arranged a layer of directive material between the sensor module and the magnet assembly for increasing the directivity of the magnet in a direction towards the bottom of the housing.

By the arrangement of the magnet assembly and sensor module at lower part of the housing the tire health sensor assembly will be provided with a centre of gravity at lower part of the housing which together with the magnetic force of the magnet assembly are arranged to self-align/correct the tire health senor assembly in relation to an inner circumferential surface of the tire, preferably to the metal cord of the tire, or metal wheel of the tire.

As disclosed herein, the magnet assembly provides a sufficient retaining force such that the tire health sensor assembly will be "permanently" attached to the metal cord of the tire at the same location, but the tire health sensor assembly is such designed that it will withstand to be bouncing some around in the tire in case of rough terrain. If the tire health sensor assembly should be knocked out of position due to an impact, it will fall to the bottom of the tire, re-correct/realign and reattach to the tire metal cord due to gravitation or centrifugal forces due to the tire is rotating. If the tire health sensor assembly of any reasons should attach to the metal wheel, the tire health sensor assembly will still work as intended as the tire pressure will be the same.

The duplex communication module, which preferably can be integrated with the sensor module, is according to a first embodiment a short-range wireless duplex communication device (radio, Bluetooth or similar) arranged to communicate with one or more central units arranged in the vehicle. In an alternative embodiment the duplex communication module is arranged for direct long range duplex communication from the tire health sensor assembly to web via NB-LTE (Narrow band—Long Term Evolution) or similar technology. In a further embodiment the duplex communication module is arranged for both short-range and long range communication.

The duplex communication module, in the case being a radio, preferably uses a proprietary protocol, but can in addition or instead use M-bus or threads protocol or similar, or be arranged for using a number of different protocols.

The duplex communication module accordingly provides bidirectional communication between the tire health sensor assembly and external units. In this way the settings of the sensors in the sensor module can be changed, as well as communication protocols, measurement schedules etc.

The housing, which is preferably formed in an impact reducing material, will further provide a protected location of the sensor module and duplex communication module, such that no impacts/objects can directly hit the sensor module or communication module.

The disclosed embodiments provide a plain production method by that the housing can be casted in e.g. rubber, composite or plastic material, and will be waterproof.

In the cases where the sensor module includes a temperature sensor, the inventive embodiments provide a considerable advantage over prior art by that the tire health sensor assembly is fixed to the metal cord of the tire, accordingly positioned where the temperature normally will be highest.

Further, by providing the sensor module with a vibration or sound sensor one can detect error/fault in bearings, shafts, brake discs etc.

The control unit will be arranged for controlling the sensors of the sensor module as when measurements are to be performed and controlling the duplex communication module. The tire health sensor assembly can be arranged to perform measurement at a time schedule and transmit the results at desired intervals, and/or be arranged to be woke by a signal and then perform and report measurements.

Further, sensor data can be stored in a gateway and be transmitted to an external unit upon request.

Accordingly, the disclosed embodiments provide a tire health sensor assembly adapted for being arranged in the tire by means of magnet(s), and which are arranged for wireless duplex communication of measured sensor data.

According to a further embodiment the housing, at least at lower part thereof, is formed by a self-vulcanizing material.

According to a further embodiment the housing, at least at lower part thereof, at exterior surface is provided with a vulcanizing material.

By means of the vulcanizing material the housing can become firmly attached to interior surface of the tire over time/with temperature.

The tire health sensor assembly is further preferably arranged to communicate wirelessly with a data acquisition unit arranged in the vehicle. The data acquisition unit can be arranged to forward the measured sensor data to the web (cloud).

In an alternative embodiment of the disclosed tire health sensor assembly it is preferably arranged to communicate wirelessly directly to the web (cloud) by NB long range radio, NB-LTE, LoRa or similar.

In a further embodiment of the disclosed tire health sensor assembly it is arranged for being located/positioned locally by received signal strength indicator (RSSI) or time of flight (TOF), or globally by GPS, GNSS or Glonass.

As described above the assembly of the tire health sensor assembly is plain. By providing the tire health sensor assembly with a scannable or readable code, such as QR-code, 2D-code, barcode, data matrix, etc. or RFID-tag with identification code (ID), one can use a smartphone/pad/RFID-reader or similar to scan/read the code/tag before the tire health sensor assembly is inserted into the tire, and when inserted into the tire, the tire health sensor assembly is ready for use.

If tires are to be stored on a metal wheel/rim before being mounted on a vehicle, e.g. a scannable or readable associated code, such as QR-code, 2D-code, barcode, data matrix, etc. or associated RFID-tag with ID, can be arranged on an outer surface of the tire or metal rim/wheel, or on valve cap for later use.

The disclosed tire health sensor assembly can further comprise a RFID reader arranged for reading a tire manufacturer built-in RFID-tag.

The smartphone/pad/PC is preferably provided with an application for arranging the separate tire health sensor assembly to an external unit, such as separate data acquisition unit. This application is preferably provided with a drag and drop function. By drag and drop of the separate tire health sensor assembly to the correct axle/wheel on an interface on the monitor of the smartphone/pad/PC the tire health sensor assembly is ready for use.

The tire health sensor assembly can work as alone unit or several tire health sensor assemblies can work together to form separate systems, as well as sub-systems.

An application of the disclosed embodiments is the use of tire health sensor assemblies on heavy goods vehicles. In such a case the tire health sensor assemblies of the truck and trailer can work as separate systems. Separate data acquisition units can be arranged in both the truck and trailer. In this way will each trailer be able to work as free-standing tire health sensor assembly systems.

By that the tire health sensor assemblies further includes a motion sensor, it will be able to detect that the wheel is in motion. When the motion sensor in the trailer detects that it is in motion it can be arranged to check the environment if there are other tire health sensor assemblies being connected to different data acquisition unit and which have the same motion pattern. This will indicate that they are a part of the same vehicle. The data acquisition units can then be pared together, and sensor data be sent to the cloud, fleet management systems and display of the truck, etc. As the trucks use different trailers a new trailer in this way will automatically be connected to the correct truck.

The advantages by such a system will be enhanced by that one then will be able to see which trailer is used by each truck, and at which time. In addition a GPS/GNSS/Glonass-function in the data acquisition unit or in the tire health sensor assembly would provide information where such a trailer/truck is located.

Further use of a tire health sensor assembly according to the disclosure can e.g. be that one can compare sensor data from the tire health sensor assemblies with fuel consumption and drive pattern of the vehicle (truck/trailer). In this way one can discover if a certain trailer in average results in higher fuel consumption than others. If one knows that the tire pressure is correct, this can indicate other errors, such as that the wheel alignment is not correct.

Further, the data acquisition unit or tire health sensor assembly can be arranged to collect sensor data from other sensors arranged in the vehicle, truck or trailer, such as temperature sensors for detecting overheating in bearings, sensors for measuring fluid temperatures, weather data, temperature in a cargo room or in the cargo, load cells for measuring weight, load etc.

Accordingly, in addition to the main function of measuring pressure (and temperature) in the tire, the disclosure provides a sensor platform where also sensor data from other sensors can be collected and used.

BRIEF DESCRIPTION OF THE DRAWINGS

The present invention will below be described in further detail with references to the attached drawings, where.

DETAILED DESCRIPTION

Figure 1:
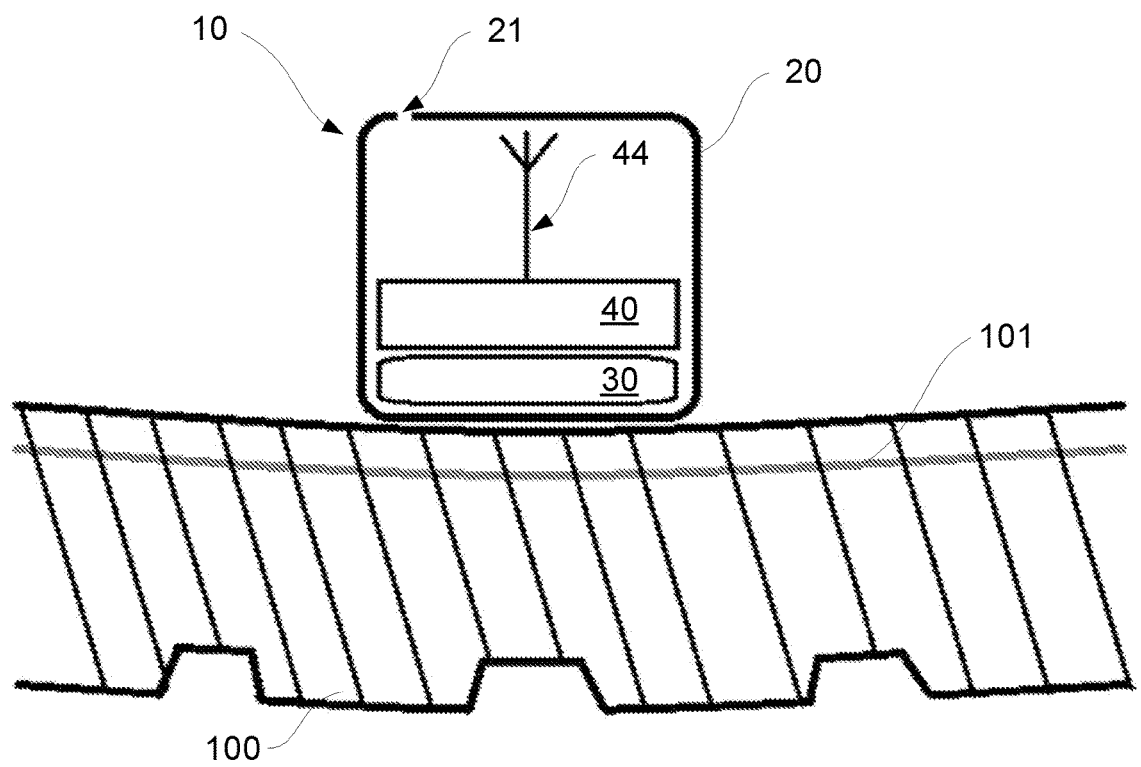
FIG. 1 is a principle drawing of a tire health sensor assembly.
Figure 2:
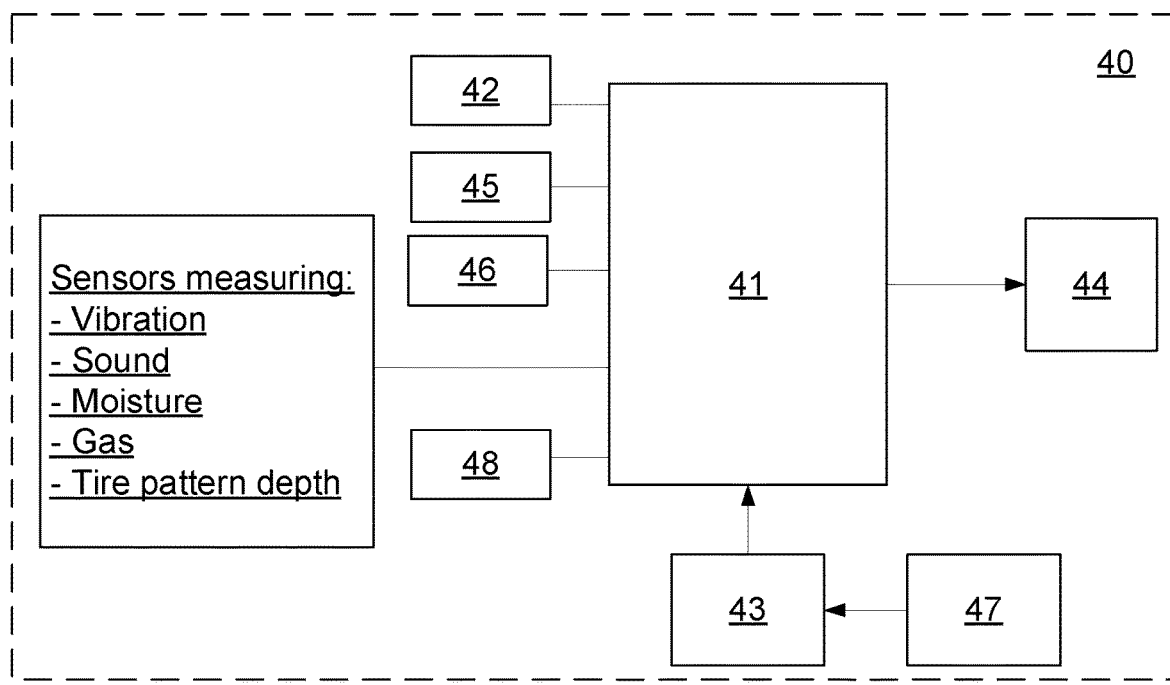
FIG. 2 is a block diagram of a sensor module.

Reference is now made to FIGS. 1 and 2 which show a principle drawing of a tire health sensor assembly 10 arranged to a tire 100 with a metal/steel cord 101 of a vehicle and a block diagram of a sensor module 40 according to the disclosure, respectively. The term vehicle is in this application related to vehicles on wheels, such as trailers, trucks, tractors, loading shovel, cars, caravans, aircrafts, etc., the wheels formed by a metal wheel/rim and a tire 100. It should be mentioned that the inventive embodiments also usable for wheels formed by non-metal rim and tire 100 with metal/steel cord 101.

A tire health sensor assembly 10 is based on a housing 20, preferably formed by an impact-absorbing material, such as rubber, composite or plastic material or similar material, or covered by an impact-absorbing material, the housing 20 being arranged for providing a waterproof and impact-absorbing encapsulation for the tire health sensor assembly 10.

The tire health sensor assembly 10 further includes a magnet assembly 30 formed at least one magnet, such as e.g. neodymium magnets which are known as the strongest type of permanent magnets commercially available. The magnet assembly 30 is arranged at a lower/bottom part of the housing 20.

According to a preferred embodiment the housing 20 preferably exhibits a mainly cylinder-shape. According to a further embodiment the housing 20 is preferably provided with a detachable lid at upper part providing access to the interior of the housing 20, which housing 20/lid is/are provided with sealing means for providing a waterproof interior environment.

The tire health sensor assembly 10 further includes a sensor module 40 which according to a first embodiment comprise a micro control unit 41 with internal and/or external memory, and at least one pressure sensor 42 for measuring tire pressure and tire pressure variations in a tire 100 and power supply means 43 and/or energy harvester 47.

The tire health sensor assembly 10 can further include a wireless duplex communication module 44, which can be integrated with the sensor module 40 or be a separate module.

The tire health sensor assembly 10 in a further embodiment includes two or more pressure sensors 42 measuring tire pressure and tire pressure variations in a tire 100 for redundancy or average measuring. The housing 20 is for enabling measuring of tire pressure preferably provided with an opening 21, allowing air/gas in the tire 100 to enter the housing 20 and enable pressure measurement by the at least one pressure sensor 42.

According to a further embodiment of the disclosed tire health sensor assembly 10 it further preferably is provided with at least one temperature sensor 45 for measuring temperature in a tire 100.

According to a further embodiment of the disclosed tire health sensor assembly 10 it further preferably is provided with at least one motion sensor 46, e.g. in the form of at least one accelerometer, gyroscope or similar, for measuring wheel motions, as well as direction and orientation of the tire health sensor assembly 10.

The wireless duplex communication module 44 is according to a first embodiment a short range wireless duplex communication device, such as RFID communication with NFC technology or similar, enabling duplex communication with external (central) units arranged in each sub vehicle (e.g. separately in trailer and truck) or a common external (central) unit for this arranged in the main vehicle.

The duplex communication module 44 according to a second embodiment is in addition arranged for direct duplex communication from the tire health sensor assembly 40 to web (cloud) via NB long range radio, such as NB-LTE, LoRa, NB-IOT or similar technology.

The wireless duplex communication module 44 can, according to a further embodiment, include e.g. Bluetooth communication for enabling communication with a smartphone, pad or similar.

In a further embodiment the duplex communication module 44 is arranged for both short range and long range communication.

The sensor module 40 is preferably arranged above the magnet assembly 30.

The power means 43 is preferably one or more batteries (Lithium) or capacitors. In an alternative embodiment the batteries or capacitors are chargeable and arranged to at least one energy harvester 47 capable of providing at least a part of the energy required to operate the tire health sensor assembly 10. In a further alternative embodiment there is only used an energy harvester 47. The energy harvester 47 can e.g. be a resonant mechanical device in a material capable of generating electric power when subjected to mechanical influence (e.g. acceleration, rotation, bending, etc.), for example a piezoelectric device or be a device capable of transforming mechanical energy or kinetic energy, for example from mechanical vibration, into electric energy.

According to a further embodiment the tire health sensor assembly 10 includes several energy harvesters 47 designed to harvest energy from different sources, such as one for vibration, one for acceleration, one for temperature, etc.

According to a further embodiment of the sensor module 40 of the tire health sensor assembly 10 the sensor module 40 is further preferably provided with one or more sensors for measuring one or more of the following: vibration, sound, speed, direction, orientation, moisture, gas, tire pattern depth, etc.

A vibration sensor (of known type) and/or sound sensor (of known type) and/or accelerometers can be used to detect abnormal vibrations in the wheel, as well as bearings, brakes, shafts etc. Accordingly, accelerometers and/or vibration sensors can be used both for detection of abnormal vibrations and for harvesting energy.

Accelerometers can further be used for detecting orientation and/or direction of the tire health sensor assembly 10 in the tire 100, as well as speed/velocity of the tire 100.

The sensor module 40 can further be provided with at least one capacitive and/or inductive sensor for measuring tire pattern depth, which capacitive and/or inductive sensor(s) also can be used as energy harvesters.

According to a further embodiment of the tire health sensor assembly 10 the sensor module 40 can further include at least one moisture sensor which can detect intrusion of water/condense into the tire health sensor assembly 10/tire 100.

According to a further embodiment of the tire health sensor assembly 10 the sensor module 40 includes at least one gas sensor which can detect the content/amount of gases in a tire 100. Usually tires 100 are filled with compressed air that is a combination of roughly 78% nitrogen ($N_2$), 21% oxygen ($O_2$) and 1% miscellaneous gases. In certain areas of use, such as racing tires, aircraft tires (commercial and military) and heavy-duty equipment tires (earthmovers and mining equipment) it is used a higher content of nitrogen and even pure nitrogen is used in some application. By that the sensor module 40 includes a gas sensor one will be able to detect the amount of different gases in the tire 100, and thus the content can be changed by supplying the relevant gas.

According to a further embodiment of the tire health sensor assembly 10 the sensor module 40 includes at least one sensor 48 for localization/positioning of the tire health sensor assembly 10 locally and/or globally. Local localization/positioning can be achieved by a received signal strength indicator (RSSI) or time of flight indicator, while global localization/positioning can be achieved by a GPS- or GNSS- or Glonass device. Localization/positioning means can also be arranged in a separate localization/positioning module. Global positioning sensor can be separately arranged or combined with an antenna of communication module 44, i.e. using the same antenna for both positioning and communication.

The micro control unit 41 will further be provided with means and/or software for controlling the sensors of the sensor module 40, as well as the communication module 44, such as by adjusting measurement frequency, transmission frequency and other relevant parameters of the sensors and communication module 44.

The micro control unit 41 can further be provided with means and/or software for performing tire pressure variation measurement.

By that the magnet assembly 30 is arranged at bottom of the housing 20 and the sensor module 40 next to the magnet assembly 30 this will provide the tire health sensor assembly 10 with a centre of gravity at lower part of the housing 20, which together with magnetic force of the magnet assembly 30 are arranged to self-align/correct about a vertical centre axis through the tire housing 20, and mainly perpendicular to an inner circumferential surface of the tire 100, by that the magnet assembly 30 attach to the metal cord 101 of the tire 100. Accordingly, the tire health sensor assembly 10 will exhibit a weighted base with magnetic forces.

According to a further embodiment the housing 20 preferably at lower/bottom side thereof is provided with rounded edges to facilitate the self-aligning/correction of the housing 20 in relation to the inner surface of the tire 100.

This feature will also be valuable in relation to the use of other sensors in the sensor module 40, especially motion sensors 46, as one in this way always will ensure that they are arranged with an axis mainly perpendicular to the rotational axis of the wheel/tire 100.

Accordingly, even if the tire health sensor 10 should detach from its original location, it will only fall into the wheel well where it will re-align/correct and reattach to the tire metal cord 101. It should here be mentioned that the tire health sensor assembly 10 will be able to re-attach even if the tire 100 is rotating, i.e. moving, as the centrifugal forces will contribute in holding the tire health sensor assembly 10 to the inner circumference of the tire 100, and where the centre of gravity and magnetic force will re-align/correct the tire health sensor assembly 10 and attach it again to the metal cord 101 of the tire 100.

The inventive embodiments also work in fluid-filled wheels.

Figure 3A:
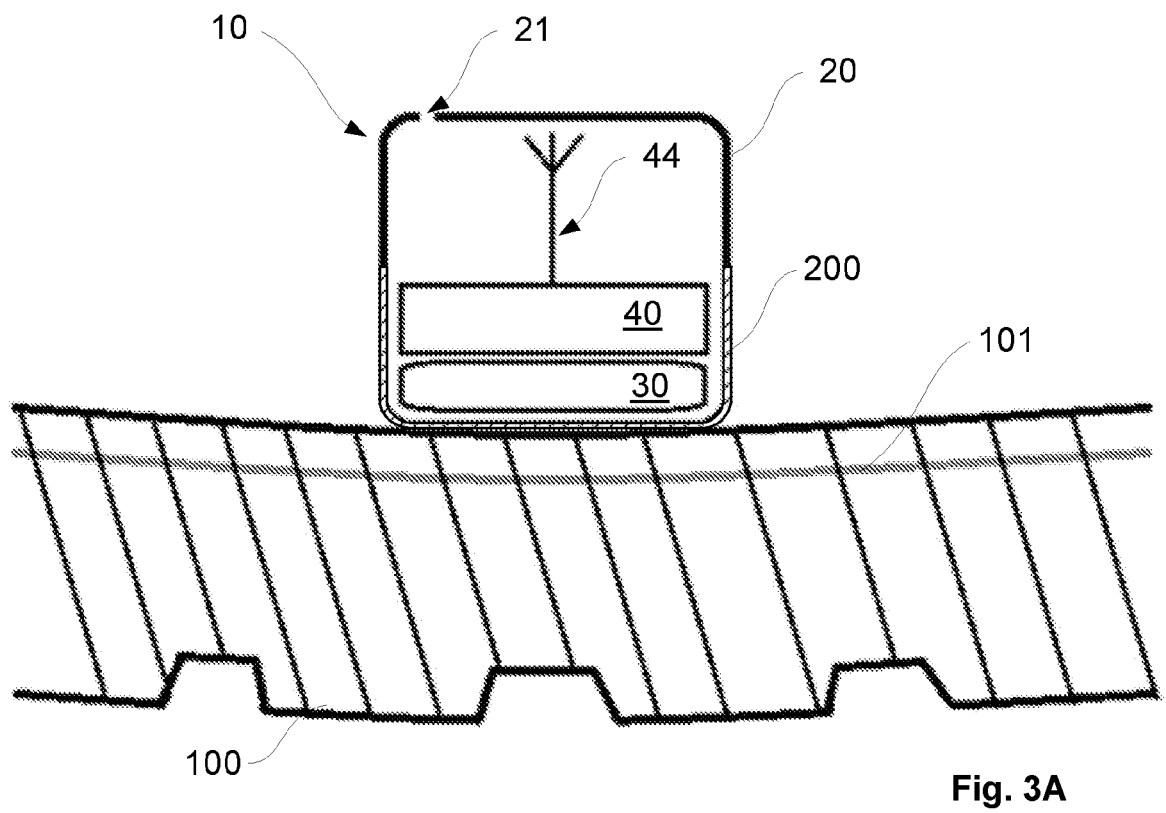
FIGS. 3A and 3B are principle drawings of a tire health sensor assembly according to an alternative embodiment of the present invention.
Figure 3B:
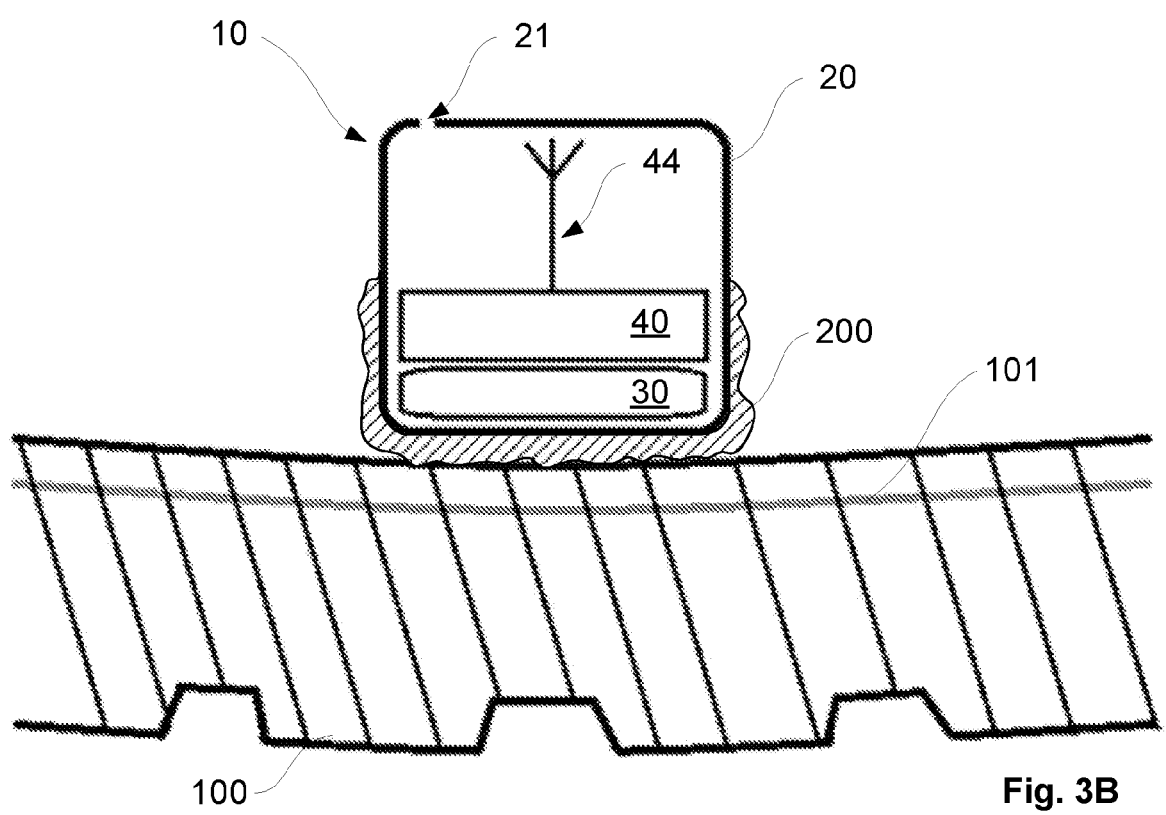

Reference is now made to FIGS. 3A and 3B, showing further embodiments. In FIG. 3A is shown an embodiment where the housing 20, at least at lower part thereof, is formed by a self-vulcanizing material 200. In FIG. 3B is shown an alternative embodiment where the housing 20, at least at lower part thereof, at exterior surface is provided with a self-vulcanizing material 200. By means of the self-vulcanizing material 200 the housing 20 and thus the tire health sensor assembly 10 can become firmly attached to interior surface of the tire 100 over time/with temperature. The self-vulcanizing material 200 can e.g. be formed by a synthetic rubber or some other suitable synthetic material with similar properties.

According to a further embodiment, a saline catalyzer, such as saline water or fluid, can further be applied to the synthetic rubber/material before the tire health sensor assembly 10 is arranged in the tire 100 to achieve a more rapid vulcanization process and more rapid hardening.

The synthetic rubber/material can be a one-component rubber/material or consist of a mixture of several components providing desired properties, whereof at least one component is compatible with the rubber of the tire 100.

According to a further embodiment, temperature measurements can be used for calibrating the pressure sensor(s).

According to a further embodiment, one tire health sensor assembly 10 of a vehicle, trailer or truck is provided with high-accurate sensors, and can be used to calibrate sensors of other tire health sensor assemblies 10 arranged in other wheels of a vehicle. E.g. if a wheel of a truck is provided with a tire health sensor assembly 10 with high-accurate sensors, this can be used for calibrating tire health sensor assemblies 10 of a trailer arranged thereto.

Further, information from the tire health sensor assemblies 10 can be used as input to automatic tire inflation systems controlling the pressure in separate tires.

Accordingly, the tire health sensor assembly 10 does not require an accurate arrangement in the wheel/tire 100 as it will re-align/correct and re-attach if the tire health sensor assembly 10 for any reason should be detached.

The invention claimed is:

1. A tire health sensor assembly (10) for arrangement in a vehicle tire (100), comprising
 a housing (20) arranged for accommodating a magnet assembly (30) having at least one magnet,
 a sensor module (40) including at least one tire pressure sensor (42),
 a power source (43) having one or more from the group consisting of a battery, capacitor and energy harvester (47), and
 a communication module (44), wherein
 the magnet assembly (30) and sensor module (40) are positioned at a lower portion of the housing (20), thereby providing the tire health sensor assembly (10) with a center of gravity at the lower portion of the housing (20),
 the combination of the position of the center of gravity and magnetic force generated by the magnet assembly (30) acts to self-align the tire health sensor assembly (10) in relation to an inner circumferential surface of the tire (100) and maintain attachment to a metal cord (101) or metal wheel of the tire (100).

2. The tire health sensor assembly according to claim 1, wherein the sensor module (40) includes at least one temperature sensor (45).

3. The tire health sensor assembly according to claim 1, wherein the sensor module (40) includes at least one motion sensor (46).

4. The tire health sensor assembly according to claim 1, wherein the sensor module (40) further comprises one or more sensors for measuring one or more properties from the group consisting of vibration, sound, moisture, gas and tire pattern depth.

5. The tire health sensor assembly according to claim 1, wherein
 the sensor module (40) comprises at least one sensor (48) for local or global positioning of the tire health sensor assembly (10), or
 the tire health sensor assembly (10) is provided with one or more of a local or global positioning module that is separate.

6. The tire health sensor assembly according to claim 1, further comprising at least one energy harvester (47) that provides at least a portion of energy required to operate the tire health sensor assembly (10).

7. The tire health sensor assembly according to claim 1, wherein the communication module (44) is arranged for one or both of short-range or NB long range wireless duplex communication.

8. The tire health sensor assembly according to claim 1, wherein the assembly (10) is arranged for duplex communication with a data acquisition unit of a vehicle or directly to web.

9. The tire health sensor assembly according to claim 1, wherein the tire health sensor assembly (10) includes a scannable or readable code selected from the group consisting of QR-code, 2D-code, barcode, data matrix, and RFID-tag with identification code.

10. The tire health sensor assembly according to claim 3, wherein the tire health sensor assembly (10) is configured to detect whether it has similar motion as other tire health sensor assemblies (10) in a vicinity thereof.

11. The tire health sensor assembly according to claim 1, wherein at least a lower part of the housing (20) is formed by a self-vulcanizing material (200).

12. The tire health sensor assembly according to claim 1, wherein at least a lower part of the housing (20) comprises a self-vulcanizing material (200).

13. The tire health sensor assembly according to claim 4, wherein the sensor module (40) comprises at least one capacitive sensor, at least one inductive sensor or both for measuring tire pattern depth.

14. The tire health sensor assembly according to claim 1, wherein the sensor module (40) includes a micro control unit (41) with internal memory, external memory or both.

15. The tire health sensor assembly according to claim 14, wherein the micro control unit (41) includes means, software or both that controls sensors of the sensor module (40), at least by controlling measurement frequency, and controls the communication module (44), at least by controlling transmission frequency.

16. The tire health sensor assembly according to claim 14, wherein the micro control unit (41) includes means, software or both that perform tire pressure variation measurement.

17. The tire health sensor assembly according to claim 1, wherein the tire health sensor assembly (10) comprises an associated scannable code or readable selected from the group consisting of QR-code, 2D-code, barcode, data matrix, and RFID-tag with identification code, arranged on an outer surface of the tire (100) or rim, or on a valve cap.

18. The tire health sensor assembly according to claim 1, wherein a layer of magnetic field directive material is arranged in connection with the magnet assembly (30) to increase a directivity of the magnet assembly (30) in a direction towards the bottom of the housing (20).

19. The tire health sensor assembly according to claim 1, wherein the tire health sensor assembly (10) comprises a RFID reader arranged for reading a tire manufacturer built-in RFID-tag.

20. The tire health sensor assembly according to claim 4, wherein the sensor module (40) includes a micro control unit (41) with internal memory, external memory or both.

\* \* \* \* \*